United States Patent Office 3,145,141
Patented Aug. 18, 1964

3,145,141
WATER-SOLUBLE COMBINATION OF NORMALLY WATER-INSOLUBLE ZINC BACITRACIN WITH ANHYDROUS CITRIC ACID
Jerome L. Martin, Terre Haute, Ind., assignor to Commercial Solvents Corporation, New York, N.Y., a corporation of Maryland
No Drawing. Filed June 25, 1959, Ser. No. 822,745
4 Claims. (Cl. 167—65)

My invention relates to new zinc bacitracin compositions particularly suitable for therapeutic purposes in the animal and poultry field. More particularly, it relates to zinc bacitracin compositions in water-soluble form for the treatment of diseases in animals and poultry.

The use of the antibiotic bacitracin in the veterinary field for the treatment and control of diseases in poultry and swine has been known for a number of years. Bacitracin even in the pure powdered form, however, is relatively unstable and for this reason its use in the veterinary field has been at a decided disadvantage. More recently, zinc bacitracin, a relatively stable form of bacitracin, has become available. In this form, the bacitracin can be stored for long periods of time and then used without material loss in antibiotic effectiveness. Unfortunately, however, for its use as a veterinary product zinc bacitracin is relatively insoluble in water in which form an antibiotic is most advantageously employed in the treatment of infected poultry and swine.

Medication is generally most successful when used early in the course of an infection and when present in sufficient quantity to control the growth of bacteria present in the infected animal. Bacterial disease is usually controlled most readily when the bacteria which cause it are multiplying rapidly and are not yet established in the organs and tissues. Unfortunately, however, for ease of medication, infected animals ordinarily lose their appetites and hense it is impossible or impractical to administer sufficient quantities of the antibiotic through the feed medium to effect satisfactory treatment. Although infected animals usually do not eat readily, they still drink adequate quantities of water to serve as a practical means of administering antibiotics in the amounts required for the treatment of the infected animals.

Because of its relative insolubility in water, ordinary zince bacitracin is incorporated into the drinking water of infected poultry and swine with extreme difficulty, the zinc bacitracin having a tendency to form into clumps or balls or fall to the bottom of the container when added to water with the result that uniform amounts of the antibiotic are not incorporated throughout the body of the water, with the result that most animals fail to receive adequate treatment. I have now discovered that zinc bacitracin can be readily dissolved in the drinking water of poultry and swine if mixed with suitable quantities of citric acid. I have found, for example, that if powdered zinc bacitracin is thoroughly incorporated with citric acid, preferably in the ratio of ¼ to 20, and preferably 3, parts by weight of citric acid to 1 part of zinc bacitracin, the zinc bacitracin is then readily dissolved in water in the amounts required for medication of poultry and swine. For ease in administering correct dosages, as well as for facilitating the solution of the zinc bacitracin-citric acid composition, it is desirable to mix the latter with an inert water-soluble diluent. For this purpose, I prefer to use a soluble carbohydrate such as sucrose, dextrose and the like, in either pure or crude form, although any other water-soluble diluent which is inert to zinc bacitracin and citric acid in both solid and solution form can be satisfactorily employed. The zinc bacitracin-citric acid composition can be mixed with the inert diluent in any desired ratio. I have found it preferable, however, to mix the zinc bacitracin-citric acid composition with an inert diluent such as sucrose in amounts such that the final mixture contains approximately 25–50 grams of bacitracin activity per pound of mixture. Such a composition lends itself to ready measurement when used in making up water solutions for treatment of diseases in both poultry and swine.

The specific example given below will illustrate the preparation of my new composition, but it is distinctly understood that I do not desire to be limited either to the particular ratios of ingredients or to the particular diluent employed therein, nor to the particular method of combining the ingredients, since various modifications thereof can be satisfactorily employed.

A mixture of 26.250 grams of powdered zinc bacitracin, 75 grams of anhydrous granular citric acid, and about 353 grams of powdered sucrose was placed in a rotary drum and agitated until thoroughly mixed. The resulting mixture was then used in the proportions of two level teaspoonsful to one gallon of drinking water for the treatment and alleviation of chronic respiratory disease in chickens and infectious sinusitis in turkeys. The zinc bacitracin-citric acid composition dissolved in the water readily and the resulting water solution was palatable to poultry to such an extent that they consumed normal amounts of water with the result that after seven to ten days' time, the chickens were found to be uniformly free from disease organisms sensitive to bacitracin. The zinc bacitracin in my new composition was found not only to dissolve readily in the water, but to pass along the digestive tract of both poultry and swine rapidly and to act selectively on the streptococci and staphylococci which are the usual secondary invaders in the animal while not interfering with the helpful intestinal bacteria. My new composition, therefore, not only is effective in the treatment and alleviation of disease but permits the full development of the helpful B-vitamin producing bacteria which stimulate growth of poultry and swine.

To determine the effectiveness of my new composition as a growth-stimulant, the following experiment was run.

Four lots of 12 male chicks per lot were given water over a seven-day test period of the following compositions:

| Lot No. | Treatment | Level Added,[1] g./liter |
|---|---|---|
| I | Plain tap water | |
| II | Plain tap water+citric acid mixture | 3.24 |
| III | Plain tap water+zinc bacitracin | 2.86 |
| IV | Plain tap warte+citric acid+zinc bacitracin | 3.43 |

[1] II—Citric acid mixture equal 75 grams citric acid+353.6 grams cerelose. III—Zinc bacitracin equal 25 g. zinc bacitracin+353.6 g. cerelose. IV—Citric acid+zinc bacitracin equal 75 g. citric acid+25 g. zinc bacitracin+353.6 cerelose.

At the end of the seven-day test period, the following results were recorded.

AVERAGE GAIN IN WEIGHT, GRAMS

| Plain Tap Water | Citric Acid | Zinc Bacitracin | Citric Acid+Zinc Bacitracin |
|---|---|---|---|
| 155.8 | 160.9 | 166.0 | 168.8 |

AVERAGE DAILY GAIN, GRAMS (7 DAYS)

| | | | |
|---|---|---|---|
| 22.26 | 22.99 | 23.71 | 24.11 |

The above results show that the chicks not only took the normal amount of water containing my new bacitracin composition, but that the zinc bacitracin functioned normally as a growth stimulant.

Now having described my invention, what I claim is:

1. A water-soluble zinc-bacitracin composition comprising normally water-insoluble zinc bacitracin and substantially anhydrous citric acid in the ratios of ¼ to 20 parts by weight of substantially anhydrous citric acid to 1 part by weight of substantially water-insoluble zinc bacitracin.

2. A water-soluble zince bacitracin composition comprising normally water-insoluble zinc bacitracin and substantially anhydrous citric acid in the ratio of about 3 parts by weight of substantially anhydrous citric acid to 1 part by weight of substantially water-insoluble zinc bacitracin.

3. A water-soluble zinc bacitracin composition comprising normally water-insoluble zinc bacitracin, substantially anhydrous citric acid in ratios of ¼ to 20 parts by weight of substantially anhdyrous citric acid to 1 part by weight of substantially water-insoluble zinc bacitracin, and a water-soluble diluent inert to said zinc bacitracin and citric acid in both solid and water solution forms in amounts such that the final composition contains approximately 25 to 50 grams of bacitracin activity per pound of composition.

4. The composition of claim 3 wherein said water-soluble inert diluent is sucrose.

References Cited in the file of this patent

UNITED STATES PATENTS 2,803,584     Hodge et al. _____ Aug. 20, 1957